United States Patent
Schneider et al.

(10) Patent No.: US 10,033,651 B2
(45) Date of Patent: Jul. 24, 2018

(54) METHOD AND DEVICE FOR REGULATING A QUALITY OF SERVICE BETWEEN A LOCAL AREA NETWORK AND A WIDE AREA NETWORK

(71) Applicant: Robert Bosch GmbH, Stuttgart (DE)

(72) Inventors: Klaus Schneider, Ludwigsburg (DE); Frank Hofmann, Hildesheim (DE); Ralf Luebben, Osterode (DE); Gafur Zymeri, Hannover (DE); Volker Blaschke, Ludwigsburg (DE); Radu Circa, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 250 days.

(21) Appl. No.: 14/859,775

(22) Filed: Sep. 21, 2015

(65) Prior Publication Data

US 2016/0119241 A1 Apr. 28, 2016

(30) Foreign Application Priority Data

Oct. 28, 2014 (DE) .................. 10 2014 221 975

(51) Int. Cl.
| | | |
|---|---|---|
| *H04L 12/26* | (2006.01) | |
| *H04L 12/857* | (2013.01) | |
| *H04L 12/803* | (2013.01) | |
| *H04L 12/813* | (2013.01) | |
| *H04L 12/815* | (2013.01) | |
| *H04L 12/859* | (2013.01) | |

(52) U.S. Cl.
CPC ........ *H04L 47/2491* (2013.01); *H04L 47/125* (2013.01); *H04L 47/20* (2013.01); *H04L 47/22* (2013.01); *H04L 47/2475* (2013.01)

(58) Field of Classification Search
None
See application file for complete search history.

(56) References Cited

U.S. PATENT DOCUMENTS

| | | | | |
|---|---|---|---|---|
| 9,258,742 | B1 * | 2/2016 | Pianigiani | H04L 67/327 |
| 2014/0254576 | A1 * | 9/2014 | Varma | H04W 48/16 |
| | | | | 370/338 |
| 2015/0304737 | A1 * | 10/2015 | Franklin | H04N 21/44222 |
| | | | | 725/14 |
| 2016/0105500 | A1 * | 4/2016 | Anchan | H04L 67/1051 |
| | | | | 370/329 |

FOREIGN PATENT DOCUMENTS

EP 1 267 584 12/2002

* cited by examiner

*Primary Examiner* — Alex Skripnikov
(74) *Attorney, Agent, or Firm* — Norton Rose Fulbright US LLP; Gerard Messina

(57) ABSTRACT

A method is provided for regulating a Quality of Service in a local area network, including the following: a Quality of Service regulator receives at a gateway of the local area network, from at least one Quality of Service checker, a status report concerning a distributed application; the Quality of Service regulator establishes, based on the status report, traffic engineering rules pertaining to the gateway; and the Quality of Service regulator transmits the traffic engineering rules to a Quality of Service controller. A corresponding device, a corresponding computer program and a corresponding storage medium are also provided.

10 Claims, 1 Drawing Sheet

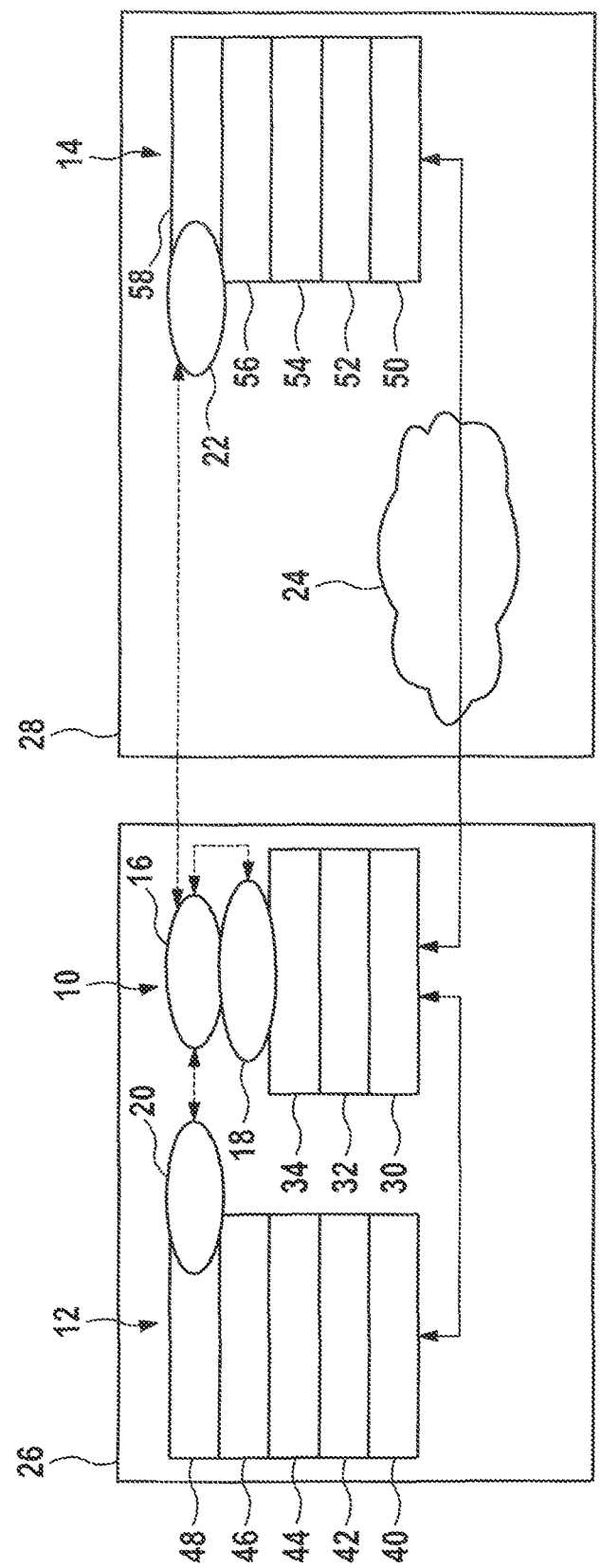

US 10,033,651 B2

METHOD AND DEVICE FOR REGULATING A QUALITY OF SERVICE BETWEEN A LOCAL AREA NETWORK AND A WIDE AREA NETWORK

RELATED APPLICATION INFORMATION

The present application claims priority to and the benefit of German patent application no. 10 2014 221 975.2, which was filed in Germany on Oct. 28, 2014, the disclosure of which is incorporated herein by reference.

FIELD OF THE INVENTION

The present invention relates to a method for regulating a Quality of Service between a local area network and a wide area network. The present invention also relates to a corresponding device, to a corresponding computer program and to a corresponding storage medium.

BACKGROUND INFORMATION

In telecommunications and IT management, the quality of a communications service from the user's perspective is commonly referred to as the Quality of Service (QoS). EP 1267584 B1 describes a method for evaluating the Quality of Service of a communications network, in which an actual Quality of Service, which is actually available to a user, is determined. For this purpose, the communications network and the user agree upon a target Quality of Service, and an evaluation result is calculated by comparing the actual Quality of Service with the target Quality of Service.

SUMMARY OF THE INVENTION

The present invention provides a method for regulating a Quality of Service between a local area network and a wide area network, as well as a corresponding device, a corresponding computer program and a corresponding storage medium as recited in the independent claims.

One advantage of this approach lies in the implementation of a central Quality of Service regulation implemented on the gateway of a local area network to a wide area network (WAN), which includes segments, for example public networks such as the Internet, which are not controllable directly from the gateway. In this way, it is possible to harmonize dynamic Quality of Service requirements of the application through traffic engineering measures such as traffic shaping or prioritization at the central gateway. The provided traffic engineering is based on the feedback from applications which signal their requirements and the present status to a central Quality of Service regulator. The Quality of Service may thus be adapted to the present requirements of the applications.

The basic concept of the present invention is thus to regulate the Quality of Service at a specific point—the gateway—within the local area network using feedback from the applications. The use of a single point within the local area network for regulating the Quality of Service makes it possible to regulate the Quality of Service for all data flows to different back-end systems, and does not require any remote gateway in the back-end system. The use of feedback from the application gives direct and objective feedback from applications based on continuous measurements which cannot be monitored at the gateway itself. The central implementation of the traffic engineering rules does not require the continuous provision of configurable network devices.

Further advantageous embodiments of the present invention are specified herein.

One exemplary embodiment of the present invention is shown in the drawing and will be described in greater detail below.

BRIEF DESCRIPTION OF THE DRAWING

The FIGURE shows the block diagram of a system landscape suitable for implementing a method according to the present invention, whereby the logical signal flow for controlling the Quality of Service regulation between the main components of the introduced approach is represented by dashed arrows, whereas the physical data flow is represented by solid arrows.

DETAILED DESCRIPTION

The FIGURE represents the exemplary design of a network composed of a local area network (LAN) 26 and a wide area network 28, whereby a gateway 10 of local area network 26 connects the latter to wide area network 28. For this purpose, gateway 10 adheres to a number of network protocols, which in the drawing are depicted in the traditional manner in the form of a so-called protocol stack 30, 32, 34 and include a physical layer 30, a media access control 32 and a network layer 34 which is built on the latter and which is based on the Internet Protocol (IP).

Built on this protocol stack 30, 32, 34 is a Quality of Service controller 18 which monitors the data flow through gateway 10 and implements predefined traffic engineering rules by way of traffic shaping, prioritization and packet control of the data flow.

For this purpose, Quality of Service controller 18 exchanges data with a Quality of Service regulator 16, which is likewise provided at gateway 10 and which, on the basis of various requirement and status reports, establishes the traffic engineering rules and transmits these to Quality of Service controller 18. The status reports concern an application 48, 58 which is distributed on local area network 26 and wide area network 28 and which is composed of a local client component 48 and a remote server component 58. Client component 48 is operated at a node 12 of local area network 26, which for this purpose provides client component 48 in turn with a protocol stack 40, 42, 44, 46 composed of physical layer 40, media access control 42, network layer 44 and transport layer 46. In contrast, server component 58 is implemented on a node 14 of wide area network 28 which is separated from local area network 26 by a public network 24 and which is likewise equipped with a physical layer 50, a media access control 52, a network layer 54 and a transport layer 56 for communication with gateway 10.

Both client component 48 and server component 58 are respectively monitored by a Quality of Service checker 20, 22, whereby a first Quality of Service checker 20 ascertains locally the status of client component 48, while a second Quality of Service checker 22 ascertains remotely the status of server component 58. At least one of Quality of Service checkers 20, 22 may also ascertain a requirement of application 48, 58. Quality of Service checkers 20, 22 transmit the resulting first status report, second status report and requirement report via local area network 26 and wide area network 28 to Quality of Service regulator 16. The latter receives the requirement report, the first status report, the second status report and also a third status report created by Quality of Service controller 18, which reflects the finding obtained by Quality of Service controller 18 as a result of monitoring the data flow at gateway 10. Quality of Service regulator 16 combines the information supplied by Quality of Service controller 18 and Quality of Service checkers 20, 22 and derives the aforementioned traffic engineering rules, which thus correspond to a consolidated view of the Quality of Service.

What is claimed is:

1. A method for regulating a Quality of Service in a local area network at a point of access to a wide area network, the method comprising:
   receiving at a Quality of Service regulator at a gateway of the local area network, from at least one Quality of Service checker, a status report concerning a distributed application;
   establishing, via the Quality of Service regulator, on the basis of the status report, traffic engineering rules pertaining to the gateway; and
   transmitting, via the Quality of Service regulator, the traffic engineering rules to a Quality of Service controller;
   wherein the gateway is connected to the wide area network (WAN), which includes segments, which are not controllable directly from the gateway,
   wherein the status report concerns the distributed application, which is distributed on the local area network and the wide area network and which is composed of a local client component and a remote server component, and
   wherein the Quality of Service is regulated at a single point, which is the gateway, within the local area network using feedback from the distributed application,
   wherein the use of a single point within the local area network for regulating the Quality of Service allows regulation of the Quality of Service for all data flows to different back-end systems, and does not require any remote gateway in the back-end systems, and
   wherein the use of feedback from the distributed application gives direct and objective feedback based on continuous measurements which cannot be monitored at the gateway.

2. The method of claim 1, further comprising:
   ascertaining, via a first Quality of Service checker of the at least one Quality of Service checker, at a node of the local area network, a status of a client component of the application;
   creating, via the first Quality of Service checker, a first status report on the basis of the status; and
   transmitting, via the first Quality of Service checker, the first status report in the local area network to the gateway.

3. The method of claim 1, further comprising:
   ascertaining, via a second Quality of Service checker of the at least one Quality of Service checker, at a node of the wide area network connected to the local area network via the gateway, a status of a server component of the application;
   creating, via the second Quality of Service checker, a second status report on the basis of the status; and
   transmitting, via the second Quality of Service checker, the second status report via the wide area network to the gateway.

4. The method of claim 1, further comprising:
   ascertaining, via the at least one Quality of Service checker, a requirement of the application;
   creating, via the at least one Quality of Service checker, a requirement report on the basis of the requirement;
   transmitting, via the at least one Quality of Service checker, the requirement report to the Quality of Service regulator;
   receiving, via the at least one Quality of Service regulator, the requirement report from the Quality of Service checker; and
   establishing the traffic engineering rules on the basis of the requirement report.

5. The method of claim 1, further comprising:
   receiving, via the Quality of Service controller, the traffic engineering rules from the Quality of Service regulator; and
   implementing, via the Quality of Service controller, the traffic engineering rules at the gateway.

6. The method of claim 5, further comprising:
   monitoring, via the Quality of Service controller, a data flow of the application via the gateway;
   creating, via the Quality of Service controller, a third another status report on the basis of the data flow;
   transmitting, via the Quality of Service controller, the another status report to the Quality of Service regulator; and
   receiving, via the Quality of Service regulator, the another status report from the Quality of Service controller.

7. The method of claim 5, wherein the implementation of the traffic engineering rules includes at least one of the following measures: traffic shaping of the data flow, prioritization of the data flow, or selection of a packet processing strategy.

8. A device for regulating a Quality of Service in a local area network at a point of access to a wide area network, comprising:
   a receiving arrangement to receive a status report concerning a distributed application from at least one Quality of Service checker by a Quality of Service regulator at a gateway of a local area network;
   an establishing arrangement to establish traffic engineering rules pertaining to the gateway by the Quality of Service regulator based on the status report; and
   a transmitting arrangement to transmit the traffic engineering rules from the Quality of Service regulator to a Quality of Service controller;
   wherein the gateway is connected to the wide area network (WAN), which includes segments, which are not controllable directly from the gateway,
   wherein the status report concerns the distributed application, which is distributed on the local area network and the wide area network and which is composed of a local client component and a remote server component, and
   wherein the Quality of Service is regulated at a single point, which is the gateway, within the local area network using feedback from the distributed application,
   wherein the use of a single point within the local area network for regulating the Quality of Service allows regulation of the Quality of Service for all data flows to different back-end systems, and does not require any remote gateway in the back-end systems, and
   wherein the use of feedback from the distributed application gives direct and objective feedback based on continuous measurements which cannot be monitored at the gateway.

9. A non-transitory computer readable medium having a computer program, which is executable by a processor, comprising:

a program code arrangement having program code for regulating a Quality of Service in a local area network at a point of access to a wide area network, by performing the following:

receiving at a Quality of Service regulator at a gateway of the local area network, from at least one Quality of Service checker, a status report concerning a distributed application;

establishing, via the Quality of Service regulator, on the basis of the status report, traffic engineering rules pertaining to the gateway; and transmitting, via the Quality of Service regulator, the traffic engineering rules to a Quality of Service controller;

wherein the gateway is connected to the wide area network (WAN), which includes segments, which are not controllable directly from the gateway, wherein the status report concerns the distributed application, which is distributed on the local area network and the wide area network and which is composed of a local client component and a remote server component, and wherein the Quality of Service is regulated at a single point, which is the gateway, within the local area network using feedback from the distributed application, wherein the use of a single point within the local area network for regulating the Quality of Service allows regulation of the Quality of Service for all data flows to different back-end systems, and does not require any remote gateway in the back-end systems, and wherein the use of feedback from the distributed application gives direct and objective feedback based on continuous measurements which cannot be monitored at the gateway.

10. The non-transitory computer readable medium of claim 9, further comprising:

ascertaining, via a first Quality of Service checker of the at least one Quality of Service checker, at a node of the local area network, a status of a client component of the application;

creating, via the first Quality of Service checker, a first status report on the basis of the status; and transmitting, via the first Quality of Service checker, the first status report in the local area network to the gateway;

wherein the gateway is connected to the wide area network (WAN), which includes segments, which are not controllable directly from the gateway, wherein the status report concerns the distributed application, which is distributed on the local area network and the wide area network and which is composed of a local client component and a remote server component, and wherein the Quality of Service is regulated at a single point, which is the gateway, within the local area network using feedback from the distributed application, wherein the use of a single point within the local area network for regulating the Quality of Service allows regulation of the Quality of Service for all data flows to different back-end systems, and does not require any remote gateway in the back-end systems, and wherein the use of feedback from the distributed application gives direct and objective feedback based on continuous measurements which cannot be monitored at the gateway.

\* \* \* \* \*